United States Patent
Gokemeijer et al.

(10) Patent No.: US 11,798,580 B1
(45) Date of Patent: Oct. 24, 2023

(54) HEAT-ASSISTED MAGNETIC RECORDING HEAD WITH A LASER HEATER

(71) Applicant: Seagate Technology LLC, Fremont, CA (US)

(72) Inventors: Nils Jan Gokemeijer, Edina, MN (US); James G Wessel, Savage, MN (US); Tyler Lenn Perry, Cottage Grove, MN (US); Joseph M Stephan, Eden Prairie, MN (US)

(73) Assignee: SEAGATE TECHNOLOGY LLC, Fremont, CA (US)

(*) Notice: Subject to any disclaimer, the term of this patent is extended or adjusted under 35 U.S.C. 154(b) by 0 days.

(21) Appl. No.: 17/809,607

(22) Filed: Jun. 29, 2022

(51) Int. Cl.
- *G11B 5/00* (2006.01)
- *G11B 11/105* (2006.01)
- *G11B 5/012* (2006.01)
- *G11B 13/08* (2006.01)
- *G11B 7/126* (2012.01)
- *G11B 5/31* (2006.01)
- *G11B 5/60* (2006.01)

(52) U.S. Cl.
CPC ............. *G11B 5/012* (2013.01); *G11B 5/314* (2013.01); *G11B 5/6088* (2013.01); *G11B 7/126* (2013.01); *G11B 13/08* (2013.01); *G11B 2005/0021* (2013.01)

(58) Field of Classification Search
CPC ......... G11B 5/314; G11B 5/3306; G11B 5/54; G11B 2005/0021; G11B 13/08; G11B 11/1051; G11B 11/10506
USPC ............................................................ 360/59
See application file for complete search history.

(56) References Cited

U.S. PATENT DOCUMENTS

| | | | |
|---|---|---|---|
| 9,905,996 B2 | 2/2018 | Wessel et al. | |
| 10,692,525 B2 | 6/2020 | Goggin et al. | |
| 10,783,918 B2 | 9/2020 | Wessel et al. | |
| 11,100,951 B2 | 8/2021 | Wessel et al. | |
| 2020/0118591 A1* | 4/2020 | Wessel | G11B 5/314 |
| 2021/0383831 A1 | 12/2021 | Wessel et al. | |

* cited by examiner

*Primary Examiner* — Nabil Z Hindi

(57) ABSTRACT

A heat-assisted magnetic recording head includes a slider body, a laser, a submount, and a laser heater. The slider body is configured to contain components of the heat-assisted magnetic recording head. The laser is configured to emit electromagnetic radiation. The submount is configured to couple the laser to the slider body. The laser heater is configured to apply heat to the laser. The laser heater disposed on a surface of the slider body.

11 Claims, 9 Drawing Sheets

HEAT-ASSISTED MAGNETIC RECORDING HEAD WITH A LASER HEATER

TECHNICAL FIELD

The disclosure relates to a near-field transducer for a heat-assisted magnetic recording head of a hard disk drive.

BACKGROUND

Some hard disk drives (HDDs) utilize heat-assisted magnetic recording (HAMR) to increase the areal density of the HDD. A recording head of a HAMR HDD typically includes a laser, a near-field transducer (NFT) configured to briefly heat a small hot spot on a surface of a magnetic disk of the HDD, and a write pole configured to write data to the magnetic disk in the vicinity of the hot spot. Specifically, light emitted from the laser may couple to the NFT to produce localized surface plasmons (LSPs). Energy of the LSPs may then be emitted by the NFT to produce the hot spot on the magnetic disk. Sudden changes in emitted laser power due to mode hops may result in inaccurate writing and subsequent retrieval of data, potentially reducing the areal density capability (ADC) of the HDD by requiring an ADC margin to be introduced to compensate for variations in the write cycles (e.g., variation in written track width, variation in write timing).

SUMMARY

The present disclosure describes a heat-assisted magnetic recording (HAMR) head having a laser and a laser heater. The laser emits light of a target frequency into a waveguide. Light from the laser is directed through the waveguide toward a near-field transducer (NFT) of the HAMR head, where the light may couple to the NFT and excite localized surface plasmons (LSPs) on the NFT. In some instances, the laser may exhibit unexpected changes in emitted power, known as mode hops. These changes may be sudden or may appear gradually. In some instances, these changes in laser power negatively affect the performance of the HAMR head, such as the ability to write a consistent track width and/or transitions between written bits of data. The laser heater is configured to apply heat to the laser during and/or between writes. Applying heat to the laser may reduce the occurrence of mode hops and may improve the performance of the HAMR head (e.g., the areal density capability).

In one example, a heat-assisted magnetic recording head includes a slider body configured to contain components of the heat-assisted magnetic recording head; a laser configured to emit electromagnetic radiation; a submount configured to couple the laser to the slider body; and a laser heater configured to apply heat to the laser, the laser heater disposed on a surface of the slider body.

In another example, a heat-assisted magnetic recording head includes a slider body configured to contain components of the heat-assisted magnetic recording head; a laser configured to emit electromagnetic radiation; a submount configured to couple the laser to the slider body; and a laser heater configured to apply heat to the laser, the laser heater embedded in the slider body.

In another example, a heat-assisted magnetic recording head includes a slider body configured to contain components of the heat-assisted magnetic recording head; a laser configured to emit electromagnetic radiation, the laser embedded in the slider body; and a laser heater configured to apply heat to the laser, the laser heater embedded in the slider body and disposed proximal to the laser.

These and other features and aspects of various examples may be understood in view of the following detailed discussion and accompanying drawings.

DETAILED DESCRIPTION

Figure 1:
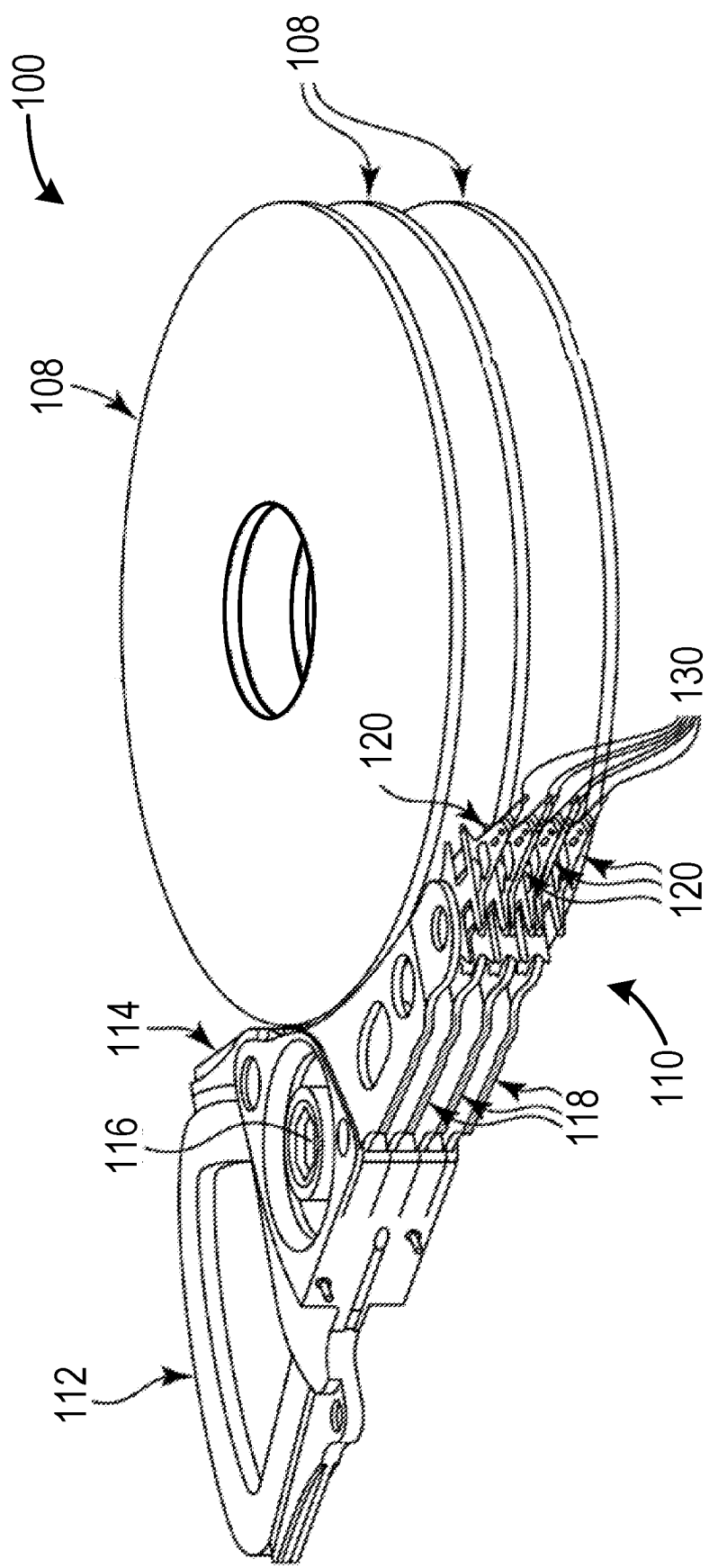
FIG. 1 is a perspective view of an example hard disk drive, in accordance with aspects of this disclosure.

FIG. 1 is a perspective view of an example heat assisted magnetic recording (HAMR) hard disk drive (HDD), in accordance with aspects of this disclosure. HDD 100 includes a head stack assembly (HSA) 110 and one or more magnetic disks 108. HSA 110 includes a plurality of head gimbal assemblies (HGA) 120. Each HGA 120 includes a HAMR head 130. Each HAMR head 130 is configured to write data to and read data from a surface of a magnetic disk 108. HSA 110 of FIG. 1 includes a voice coil drive actuator 112. Voice coil drive actuator 112 produces a magnetic field that exerts a force on an actuator mechanism 114, causing actuator mechanism 114 to rotate about a shaft 116 in either rotational direction. Rotatable drive actuator arms 118 are mechanically coupled to actuator mechanism 114 and to each HGA 120 such that rotating actuator mechanism 114 causes rotatable drive actuator arms 118 and HGAs 120, and thus HAMR heads 130, to move relative to magnetic disks 108. A HAMR head 130 may thus be positioned proximate to a location on a surface of a magnetic disk 108 during a read and/or write operation of HDD 100.

Figure 2:
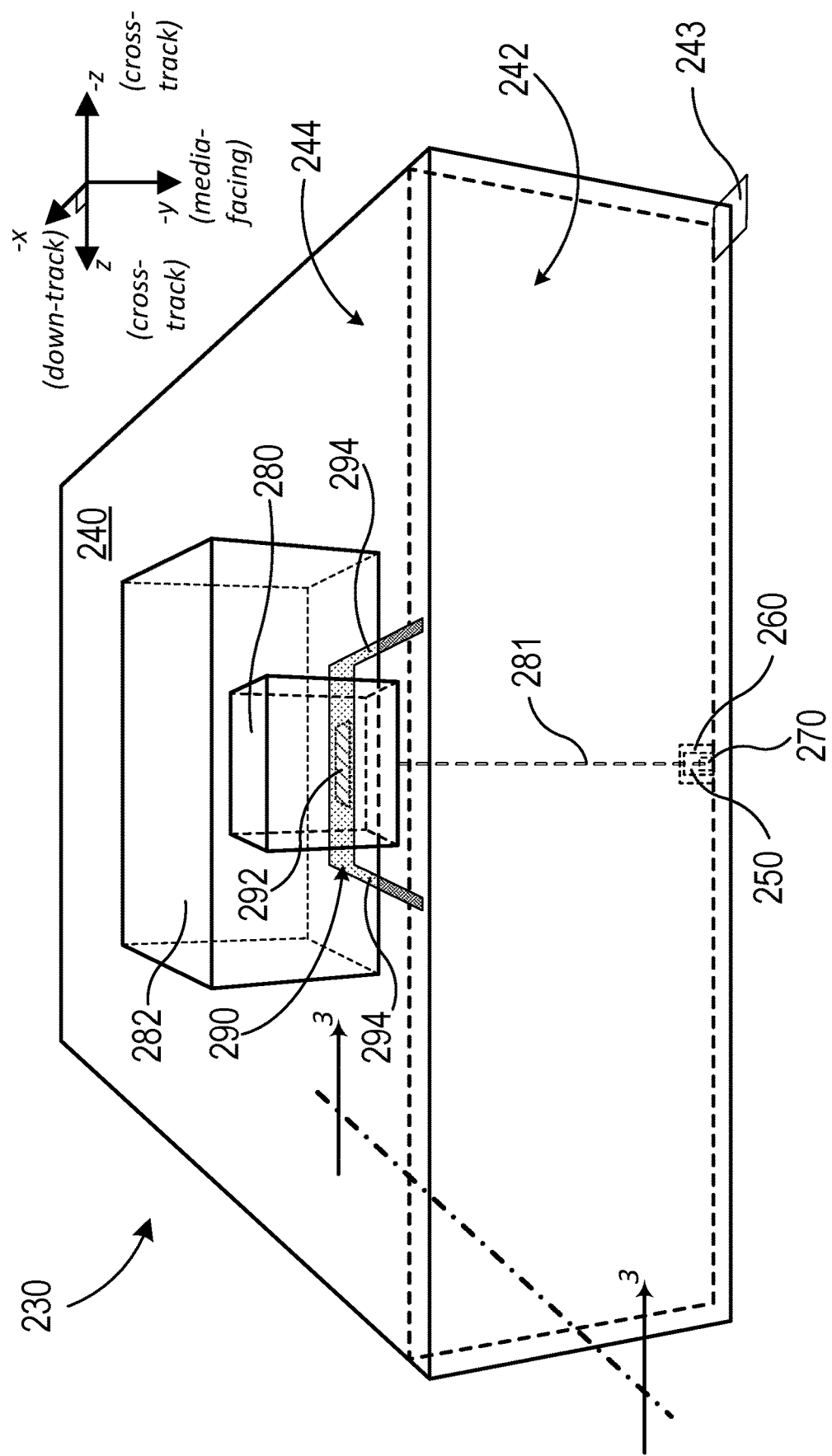
FIG. 2 is a perspective view of an example HAMR head, in accordance with aspects of this disclosure.

FIG. 2 is a perspective view of an example HAMR head, in accordance with aspects of this disclosure. HAMR head 230 may be an example of a HAMR head 130 of HDD 100 of FIG. 1.

In accordance with aspects of this disclosure, HAMR head 230 includes a slider body 240, a laser 280, a submount 282, and a laser heater 290. Slider body 240 is configured to contain components of HAMR head 230. Slider body 240 of HAMR head 230 includes a reader 250, a writer 260, a near-field transducer (NFT) 270, and a waveguide 281. Laser 280 of HAMR head 230 is coupled to submount 282. Submount 282 is configured to couple laser 280 to slider body 240. Laser heater 290 is disposed on a surface 244 of slider body 240. In the example of HAMR head 230, a part of laser heater 290 is disposed between surface 244 of slider body 240, and submount 282.

HAMR head 230 is configured to read data from and write data to a surface of a magnetic disk (e.g., a magnetic disk 108 of FIG. 1). Reader 250 is configured to generate a signal (e.g., a voltage change) in response to magnetic flux changes from bits of data on a magnetic disk. Reading of data from a magnetic disk by reader 250 may take place during a read operation (e.g., a read operation of HDD 100). Writer 260 is configured to generate a magnetic field from an electrical current and direct the magnetic field toward a magnetic disk to write bits of data on the magnetic disk (e.g., during a write operation of HDD 100, for later retrieval by reader 250 during a read operation of HDD 100).

NFT 270 is configured to focus and emit an optical near-field of localized surface plasmons (LSPs) that are excited on NFT 270. LSPs may be excited on NFT 270 through coupling with electromagnetic radiation from laser 280. An optical near-field that NFT 270 emits may be focused on an area of a magnetic disk that is proximal to HAMR head 230. Energy of an emitted optical near-field may heat and lower the coercivity of magnetic grains in the area of focus on the magnetic disk. The lower coercivity may enable a magnetic field from writer 260 to orient magnetic moments of the magnetic grains, thus enabling writing of bits of data on the magnetic disk.

In the example of HAMR head 230, some features or parts of features of reader 250, writer 260, and/or NFT 270 are presented on a media-facing surface 243 of slider body 240 that is positioned proximal to a surface of a magnetic disk (e.g., a magnetic disk 108 of FIG. 1) during some operations of the HDD (e.g., write operations and/or read operations of HDD 100 of FIG. 1). HAMR head 230 may be maintained at a spacing (e.g., a head-media spacing) from a surface of the magnetic disk during some operations of HDD 100. During such operations, media-facing surface 243 faces and is held proximate to the moving surface of the magnetic disk by a cushion of gas, known as an active air bearing (AAB), that is produced from a dynamic flow of gas across a pattern of recessed sub-surfaces bound within the volume of slider body 240.

Laser 280 is configured to emit electromagnetic radiation. Laser 280 may, for example, emit electromagnetic radiation having a wavelength in the near infrared range (e.g., approximately 830 nm) or visible range. Waveguide 281 is integrated into slider body 240 and is configured to receive electromagnetic radiation that laser 280 emits and propagate the electromagnetic radiation toward and proximal to NFT 270. The electromagnetic radiation may then couple to electrons of NFT 270 to excite LSPs on NFT 270. Waveguide 281 may include a material having a high refractive index (e.g., greater than 1.5) and that is optically transparent at the wavelength of the electromagnetic radiation from laser 280. In some examples, waveguide 281 includes niobium oxide.

In the example of HAMR head 230 of FIG. 2, laser 280 is fabricated separately from slider body 240 and its components and is coupled to slider body 240 by submount 282. Various configurations of laser 280 are contemplated. For example, laser 280 may be configured as an edge-emitting laser. In other examples, laser 280 may be configured as a surface-emitting laser (e.g., a vertical cavity surface-emitting laser). In some examples, epitaxial layers of laser 280 include gallium arsenide, indium gallium arsenide, and/or aluminum gallium arsenide.

Laser heater 290 is configured to apply heat to laser 280 (e.g., during an operation and/or between operations of HAMR head 230). Laser heater 290 may generate heat through resistive heating (e.g., by passing a current through laser heater 290). Laser heater 290 of FIG. 2 includes a heating element 292 and leads 294. Heating element 292 is disposed between surface 244 of slider body 240, and submount 282. In the example of HAMR head 230, surface 244 is opposite media-facing surface 243 of slider body 240. Heating element 292 may include a conductive material (e.g., titanium) that heats upon passing a current through heating element 292. Leads 294 may be configured to couple laser heater 290 to a power source (e.g., a power source of HDD 100 of FIG. 1). Leads 294 extend toward an end 242 of slider body 240.

In some examples, utilizing laser heater 290 to apply heat to laser 280 may mitigate undesired changes in power that laser 280 emits, such as changes related to mode hops (e.g., sudden or gradual changes in emissive power due to thermal or other factors). The occurrence of mode hops in a HAMR head may result in variations in written track width, drive timing, and/or other aspects of data that is written by the HAMR head. In some instances, these variations necessitate a performance margin to be applied to an HDD that includes the HAMR head, resulting in a lower areal density capability (ADC) of the associated HDD. Additionally, the occurrence of a mode hop during a write operation may result in errors during a subsequent read operation, potentially necessitating data rewrites and/or resulting in lost data. Utilizing laser heater 290 to heat laser 280 (e.g., during a write operation, between write operations) may enable laser 280 to be operated at a more consistent temperature, such as by applying or reducing the application of heat by laser heater 290 to laser 280 in response to feedback from laser 280. Operating laser 280 at a more consistent temperature may reduce the occurrence of mode hops during operations of HAMR head 230. Reducing mode hops may reduce variations in power that laser 280 emits and may potentially improve the performance (e.g., ADC) of HAMR head 230 and its associated HDD.

Figure 3:
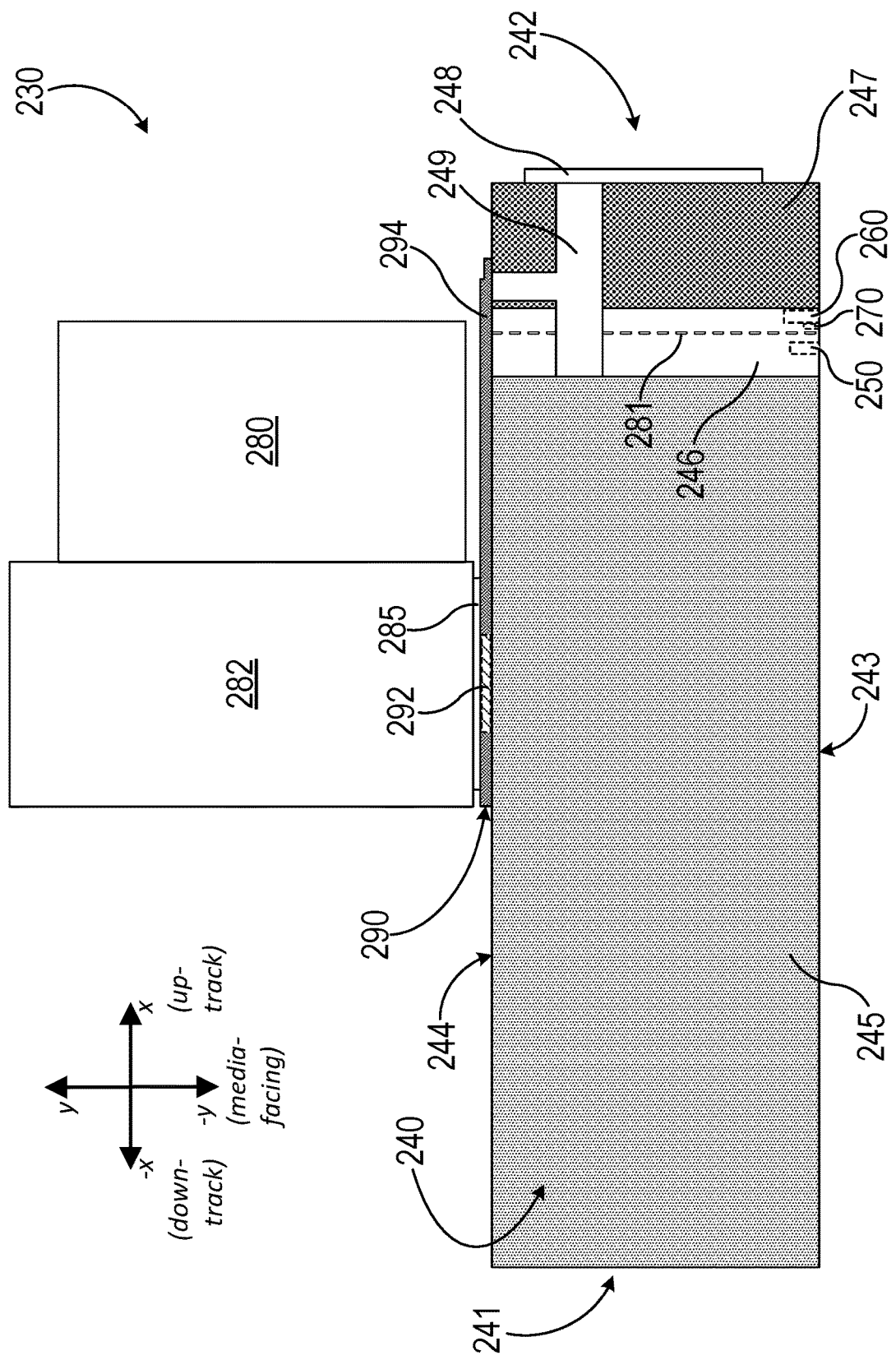
FIG. 3 is a view of an example HAMR head, in accordance with aspects of this disclosure.

FIG. 3 is a view of an example HAMR head, in accordance with aspects of this disclosure. The view of illustrated in FIG. 3 is a view of HAMR head 230 of FIG. 2, with the view of HAMR head 230 illustrated in FIG. 3 indicated by line 3-3 of FIG. 2 facing in the direction of the arrows.

Laser heater 290 is disposed on surface 244 of slider body 240. Part of laser heater 290 (e.g., a part that includes heating element 292) is disposed between surface 244 of slider body 240, and submount 282. Surface 244 of slider body 240 is opposite media-facing surface 243 of slider body 240. Leads 294 extend toward an end 242 of slider body 240. A solder layer 285 is disposed between laser heater 290 and submount 282. Solder layer 285 is configured to couple submount 282 to slider body 240.

Slider body 240 includes a base region 245, a fabricated region 246, and an overcoat region 247. Overcoat region 247 is disposed proximal to end 242 of slider body 240. Base region 245 is disposed proximal to an end 241 of slider body 240 that is opposite end 242 of slider body 240. Fabricated region 246 is disposed between base region 245 and overcoat region 247 of slider body 240.

Base region 245 of slider body 240 may be a segment of a wafer that components of HAMR head 230 are fabricated on. In some examples, base region 245 is a segment of an aluminum titanium carbide wafer. In the example of HAMR head 230, heating element 292 of laser heater 290 is coupled to base region 245.

Fabricated region 246 includes reader 250, writer 260, NFT 270, and waveguide 281. Reader 250, writer 260, and NFT 270 are disposed proximal to media-facing surface 243 of slider body 240. Waveguide 281 extends through fabricated region 246 from surface 244 to media-facing surface 243. Fabricated region 246 may include these and/or other features of HAMR head 230 that are fabricated on a wafer (e.g., a wafer that base region 245 is a segment of).

Overcoat region 247 is proximal to end 242 of slider body 240. Overcoat region 247 may be configured to protect and/or isolate (e.g., electrically isolate) features of HAMR head 230 (e.g., features of fabricated region 246). In some examples, one or more bondpads 248 are disposed on end 242 of slider body 240 (e.g., on overcoat region 247). Bondpads 248 may be configured to electrically couple components of HAMR head 230 (e.g., reader 250, writer 260) to circuitry of an HDD. For example, a component may be coupled to a bondpad 248, and the bondpad 248 may be soldered to a trace of an HGA (e.g., an HGA 120 of FIG. 1) that extends to a preamp or power source. HAMR head 230 further includes an electrical contact 249 that couples a lead 294 of laser heater 290 to a bondpad 248 to provide power to laser heater 290. It should be noted that electrical contact 249 is optional. Other means of coupling a laser heater 290 to a power supply are contemplated and are within the scope of this disclosure.

Figure 4:
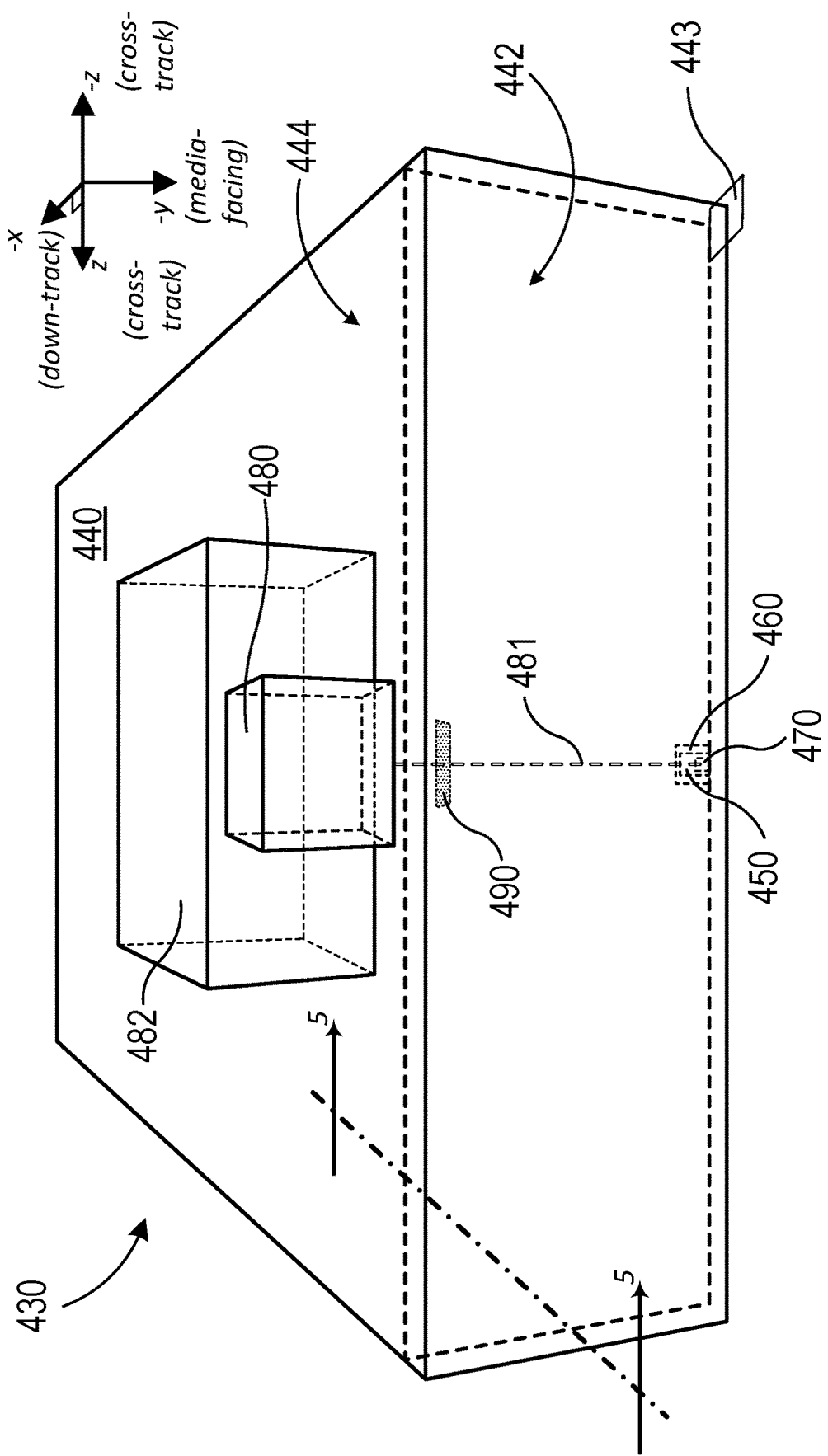
FIG. 4 is a perspective view of an example HAMR head, in accordance with aspects of this disclosure.

FIG. 4 is a perspective view of an example HAMR head, in accordance with aspects of this disclosure. HAMR head 430 may be an example of a HAMR head 130 of HDD 100 of FIG. 1.

In accordance with aspects of this disclosure, HAMR head 430 includes a slider body 440, a laser 480, a submount 482, and a laser heater 490. Slider body 440 is configured to contain components of HAMR head 430. Slider body 440 of HAMR head 430 includes a reader 450, a writer 460, a near-field transducer (NFT) 470, and a waveguide 481. Laser 480 of HAMR head 430 is coupled to submount 482. Submount 482 is configured to couple laser 480 to slider body 440. Laser heater 490 is embedded in slider body 440.

HAMR head 430 is configured to read data from and write data to a surface of a magnetic disk (e.g., a magnetic disk 108 of FIG. 1). Reader 450 is configured to generate a signal (e.g., a voltage change) in response to magnetic flux changes from bits of data on a magnetic disk. Reading of data from a magnetic disk by reader 450 may take place during a read operation (e.g., a read operation of HDD 100). Writer 460 is configured to generate a magnetic field from an electrical current and direct the magnetic field toward a magnetic disk to write bits of data on the magnetic disk (e.g., during a write operation of HDD 100, for later retrieval by reader 450 during a read operation of HDD 100).

NFT 470 is configured to focus and emit an optical near-field of localized surface plasmons (LSPs) that are excited on NFT 470. LSPs may be excited on NFT 470 through coupling with electromagnetic radiation from laser 480. An optical near-field that NFT 470 emits may be focused on an area of a magnetic disk that is proximal to HAMR head 430. Energy of an emitted optical near-field may heat and lower the coercivity of magnetic grains in the area of focus on the magnetic disk. The lower coercivity may enable a magnetic field from writer 460 to orient magnetic moments of the magnetic grains, thus enabling writing of bits of data on the magnetic disk.

In the example of HAMR head 430, some features or parts of features of reader 450, writer 460, and/or NFT 470 are presented on a media-facing surface 443 of slider body 440 that is positioned proximal to a surface of a magnetic disk (e.g., a magnetic disk 108 of FIG. 1) during some operations of the HDD (e.g., write operations and/or read operations of HDD 100 of FIG. 1). HAMR head 430 may be maintained at a spacing (e.g., a head-media spacing) from a surface of the magnetic disk during some operations of HDD 100. During such operations, media-facing surface 443 faces and is held proximate to the moving surface of the magnetic disk by a cushion of gas, known as an active air bearing (AAB), that is produced from a dynamic flow of gas across a pattern of recessed sub-surfaces bound within the volume of slider body 440.

Laser 480 is configured to emit electromagnetic radiation. Laser 480 may, for example, emit electromagnetic radiation having a wavelength in the near infrared range (e.g., approximately 830 nm) or visible range. Waveguide 481 is integrated into slider body 440 and is configured to receive electromagnetic radiation that laser 480 emits and propagate the electromagnetic radiation toward and proximal to NFT 470. The electromagnetic radiation may then couple to electrons of NFT 470 to excite LSPs on NFT 470. Waveguide 481 may include a material having a high refractive index (e.g., greater than 1.5) and that is optically transparent at the wavelength of the electromagnetic radiation from laser 480. In some examples, waveguide 481 includes niobium oxide.

In the example of HAMR head 430 of FIG. 4, laser 480 is fabricated separately from slider body 440 and its components and is coupled to slider body 440 by submount 482. Various configurations of laser 480 are contemplated. For example, laser 480 may be configured as an edge-emitting laser. In other examples, laser 480 may be configured as a surface-emitting laser (e.g., a vertical cavity surface-emitting laser). In some examples, epitaxial layers of laser 480 include gallium arsenide, indium gallium arsenide, and/or aluminum gallium arsenide.

Laser heater 490 is configured to apply heat to laser 480 (e.g., during an operation and/or between operations of HAMR head 430). Laser heater 490 may generate heat through resistive heating (e.g., by passing a current through laser heater 490). Laser heater 490 of FIG. 4 may be integrated into slider body 440 during fabrication of HAMR head 430. Steps of fabricating and integrating laser heater 490 into slider body 440 may include electrically coupling laser heater 490 to a power source (e.g., of HDD 100 of FIG. 1) that provides power to laser heater 490.

In some examples, utilizing laser heater 490 to apply heat to laser 480 may mitigate undesired changes in power that laser 480 emits, such as changes related to mode hops (e.g., sudden or gradual changes in emissive power due to thermal or other factors). The occurrence of mode hops in a HAMR head may result in variations in written track width, drive timing, and/or other aspects of data that is written by the HAMR head. In some instances, these variations necessitate a performance margin to be applied to an HDD that includes the HAMR head, resulting in a lower areal density capability (ADC) of the associated HDD. Additionally, the occurrence of a mode hop during a write operation may result in errors during a subsequent read operation, potentially necessitating data rewrites and/or resulting in lost data. Utilizing laser heater 490 to heat laser 480 (e.g., during a write operation, between write operations) may enable laser 480 to be operated at a more consistent temperature, such as by applying or reducing the application of heat by laser heater 490 to laser 480 in response to feedback from laser 480. Operating laser 480 at a more consistent temperature may reduce the occurrence of mode hops during operations of HAMR head 430. Reducing mode hops may reduce variations in power that laser 480 emits and may potentially improve the performance (e.g., ADC) of HAMR head 430 and its associated HDD.

Figure 5:
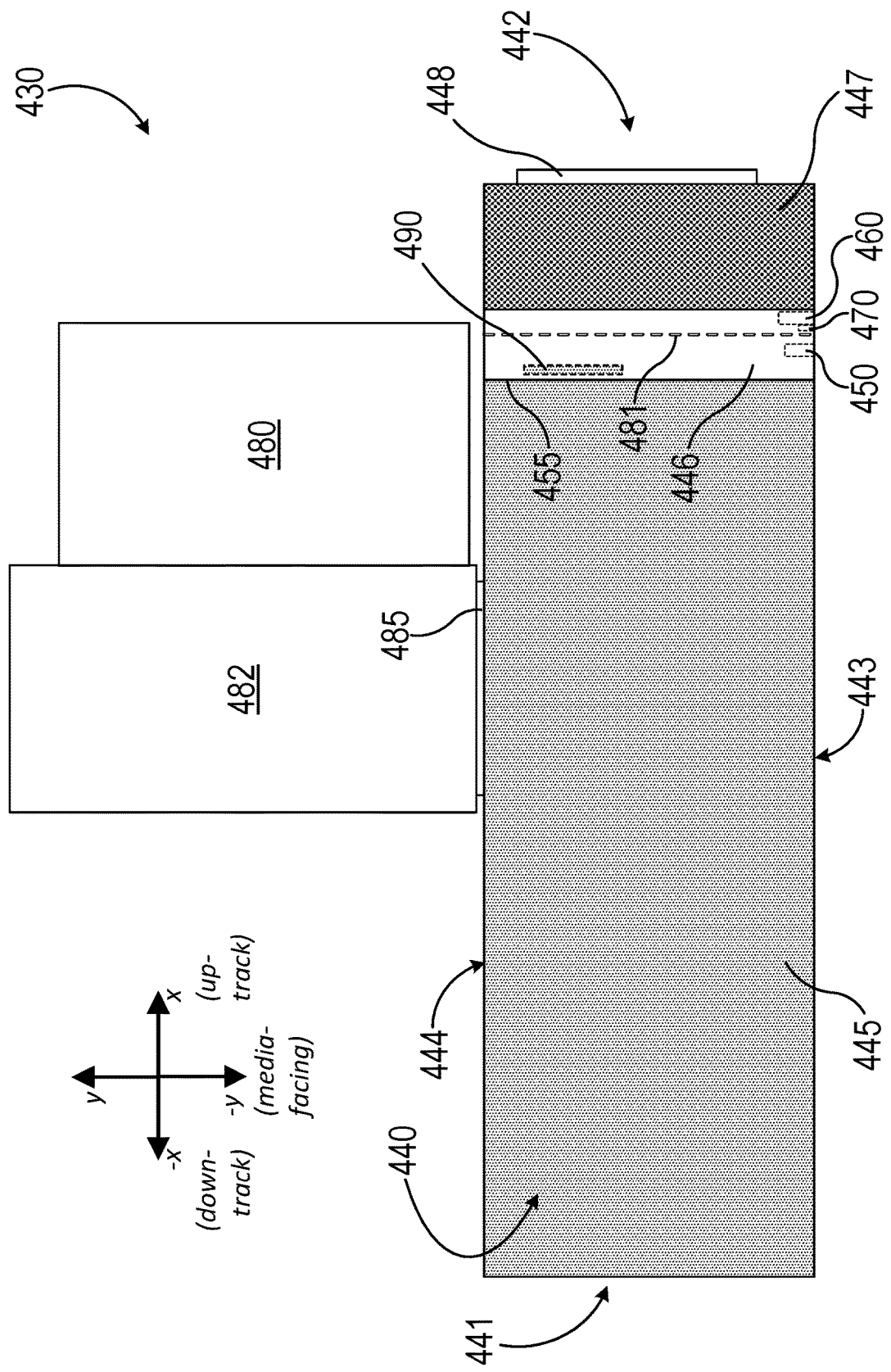
FIG. 5 is a view of an example HAMR head, in accordance with aspects of this disclosure.

FIG. 5 is a view of an example HAMR head, in accordance with aspects of this disclosure. The view of illustrated in FIG. 5 is a view of HAMR head 430 of FIG. 4, with the view of HAMR head 430 illustrated in FIG. 5 indicated by line 5-5 of FIG. 4 facing in the direction of the arrows.

A solder layer 485 is disposed between slider body 440 and submount 482. Solder layer 485 is configured to couple submount 482 to slider body 440. Slider body 440 includes a base region 445, a fabricated region 446, and an overcoat region 447. Overcoat region 447 is disposed proximal to end 442 of slider body 440. Base region 445 is disposed proximal to an end 441 of slider body 440 that is opposite end 442 of slider body 440. Fabricated region 446 is disposed between base region 445 and overcoat region 447 of slider body 440.

Base region 445 of slider body 440 may be a segment of a wafer that components of HAMR head 430 are fabricated on. In some examples, base region 445 is a segment of an aluminum titanium carbide wafer.

Laser heater 490 is embedded in fabricated region 446 of slider body 440. Fabricated region 446 further includes reader 450, writer 460, NFT 470, and waveguide 481. Fabricated region 446 may include these and/or other features of HAMR head 430 that are fabricated on a wafer (e.g., a wafer that base region 445 is a segment of). Reader 450, writer 460, and NFT 470 are disposed proximal to media-facing surface 443 of slider body 440. Waveguide 481 extends through fabricated region 446 from surface 444 to media-facing surface 443. Laser heater 490 is disposed distal to media-facing surface 443. In the example of HAMR head 430 of FIG. 5, laser heater 490 is disposed proximal to surface 444 and to an interface 455 between base region 445 and fabricated region 446.

Overcoat region 447 is proximal to end 442 of slider body 440. Overcoat region 447 may be configured to protect and/or isolate (e.g., electrically isolate) features of HAMR head 430 (e.g., features of fabricated region 446). In some examples, one or more bondpads 448 are disposed on end 442 of slider body 440 (e.g., on overcoat region 447). Bondpads 448 may be configured to electrically couple components of HAMR head 430 (e.g., reader 450, writer 460) to circuitry of an HDD. For example, a component may be coupled to a bondpad 448, and the bondpad 448 may be soldered to a trace of an HGA (e.g., an HGA 120 of FIG. 1) that extends to a preamp or power source. In some examples, a bondpad 448 may be configured to electrically couple laser heater 490 to a power source (e.g., a current or voltage source). Electrically coupling laser heater 490 to a bondpad 448 may include fabricating connections (e.g., vias) during the fabrication of fabricated region 446. Other means of coupling laser heater 490 to a power supply are contemplated and are within the scope of this disclosure.

Figure 6:
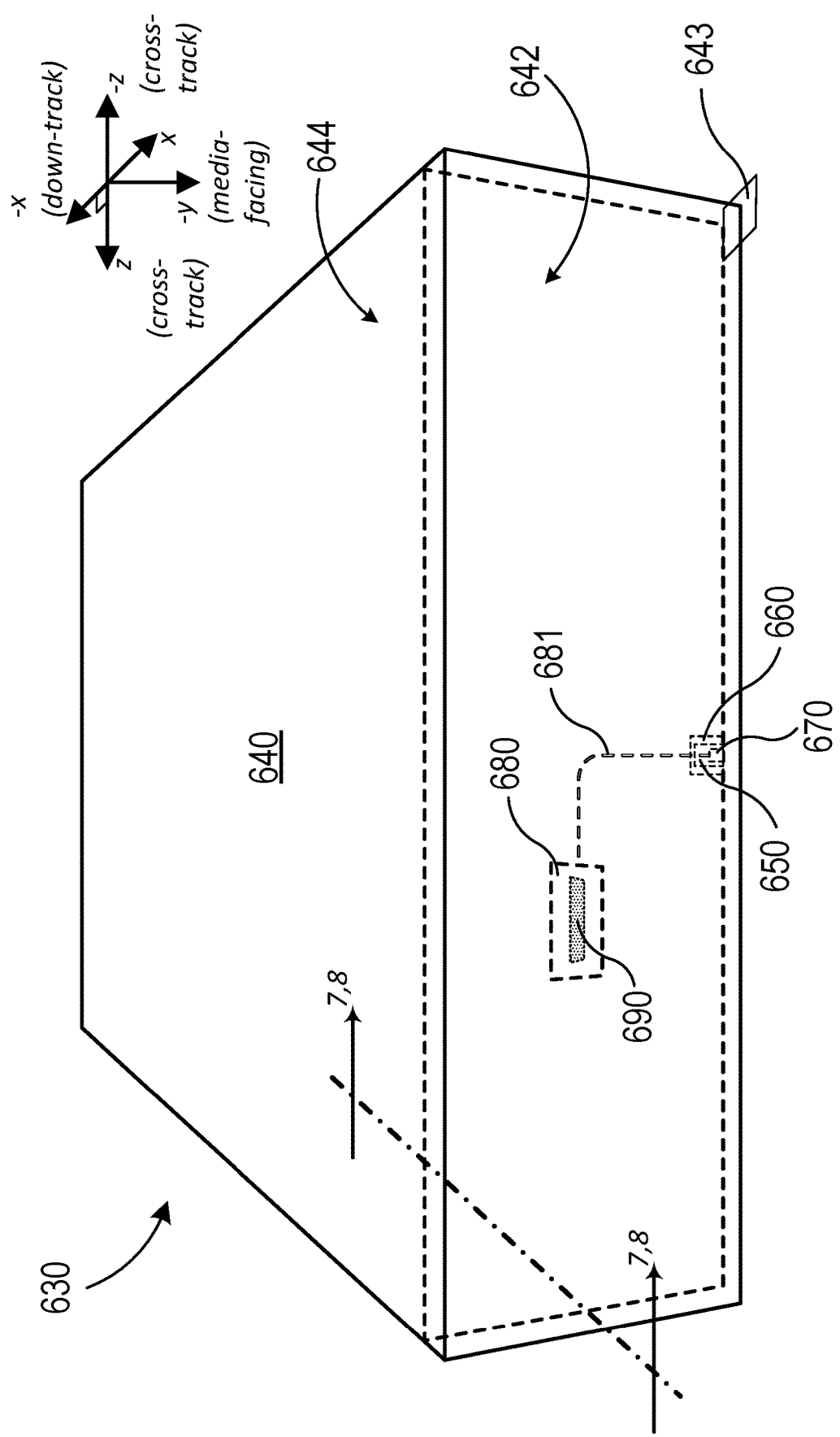
FIG. 6 is a perspective view of an example HAMR head, in accordance with aspects of this disclosure.

FIG. 6 is a perspective view of an example HAMR head, in accordance with aspects of this disclosure. HAMR head 630 may be an example of a HAMR head 130 of HDD 100 of FIG. 1.

In accordance with aspects of this disclosure, HAMR head 630 includes a slider body 640, a laser 680, and a laser heater 690. Slider body 640 is configured to contain components of HAMR head 630. Slider body 640 of HAMR head 630 includes a reader 650, a writer 660, a near-field transducer (NFT) 670, laser 680, and a waveguide 681. Laser 680 and laser heater 690 of this example are embedded in slider body 640. Laser heater 690 is disposed proximal to laser 680.

HAMR head 630 is configured to read data from and write data to a surface of a magnetic disk (e.g., a magnetic disk 108 of FIG. 1). Reader 650 is configured to generate a signal (e.g., a voltage change) in response to magnetic flux changes from bits of data on a magnetic disk. Reading of data from a magnetic disk by reader 650 may take place during a read operation (e.g., a read operation of HDD 100). Writer 660 is configured to generate a magnetic field from an electrical current and direct the magnetic field toward a magnetic disk to write bits of data on the magnetic disk (e.g., during a write operation of HDD 100, for later retrieval by reader 650 during a read operation of HDD 100).

NFT 670 is configured to focus and emit an optical near-field of localized surface plasmons (LSPs) that are excited on NFT 670. LSPs may be excited on NFT 670 through coupling with electromagnetic radiation from laser 680. An optical near-field that NFT 670 emits may be focused on an area of a magnetic disk that is proximal to HAMR head 630. Energy of an emitted optical near-field may heat and lower the coercivity of magnetic grains in the area of focus on the magnetic disk. The lower coercivity may enable a magnetic field from writer 660 to orient magnetic moments of the magnetic grains, thus enabling writing of bits of data on the magnetic disk.

In the example of HAMR head 630, some features or parts of features of reader 650, writer 660, and/or NFT 670 are presented on a media-facing surface 643 of slider body 640 that is positioned proximal to a surface of a magnetic disk (e.g., a magnetic disk 108 of FIG. 1) during some operations of the HDD (e.g., write operations and/or read operations of HDD 100 of FIG. 1). HAMR head 630 may be maintained at a spacing (e.g., a head-media spacing) from a surface of the magnetic disk during some operations of HDD 100. During such operations, media-facing surface 643 faces and is held proximate to the moving surface of the magnetic disk by a cushion of gas, known as an active air bearing (AAB), that is produced from a dynamic flow of gas across a pattern of recessed sub-surfaces bound within the volume of slider body 640.

Laser 680 is configured to emit electromagnetic radiation. Laser 680 may, for example, emit electromagnetic radiation having a wavelength in the near infrared range (e.g., approximately 830 nm) or visible range. Waveguide 681 is integrated into slider body 640 and extends from laser 680 to media-facing surface 643. Waveguide 681 is configured to receive electromagnetic radiation that laser 680 emits and propagate the electromagnetic radiation toward and proximal to NFT 670. The electromagnetic radiation may then couple to electrons of NFT 670 to excite LSPs on NFT 670. Waveguide 681 may include one or more bends or angles to direct electromagnetic radiation from laser 680 to NFT 670. Waveguide 681 may include a material having a high refractive index (e.g., greater than 1.5) and that is optically transparent at the wavelength of the electromagnetic radiation from laser 680. In some examples, waveguide 681 includes niobium oxide.

In the example of HAMR head 630 of FIG. 6, laser 680 may be fabricated through on-wafer laser (OWL) processing. Steps of OWL processing may include the growth of an epitaxial layer or stack on a donor substrate, patterning of the epitaxial layer or stack on the donor substrate, transfer of the patterned epitaxial layer or stack from the donor to a wafer on which HAMR head 630 is being fabricated (e.g., a wafer that includes some components of HAMR head 630 that have already been fabricated), and further processing of the epitaxial layer or stack to form the final profile and features of laser 680. In some examples, epitaxial layers of laser 680 include gallium arsenide, indium gallium arsenide, and/or aluminum gallium arsenide.

Laser heater 690 is configured to apply heat to laser 680 (e.g., during an operation and/or between operations of HAMR head 630). Laser heater 690 may generate heat through resistive heating (e.g., by passing a current through laser heater 690). Laser heater 690 of FIG. 6 may be integrated into slider body 640 during fabrication of HAMR head 630. Steps of fabricating and integrating laser heater 690 may include electrically coupling laser heater 690 to a power source (e.g., of HDD 100 of FIG. 1) that provides power to laser heater 690.

In some examples, utilizing laser heater 690 to apply heat to laser 680 may mitigate undesired changes in power that laser 680 emits, such as changes related to mode hops (e.g., sudden or gradual changes in emissive power due to thermal or other factors). The occurrence of mode hops in a HAMR head may result in variations in written track width, drive timing, and/or other aspects of data that is written by the HAMR head. In some instances, these variations necessitate a performance margin to be applied to an HDD that includes the HAMR head, resulting in a lower areal density capability (ADC) of the associated HDD. Additionally, the occurrence of a mode hop during a write operation may result in errors during a subsequent read operation, potentially necessitating data rewrites and/or resulting in lost data. Utilizing laser heater 690 to heat laser 680 (e.g., during a write operation, between write operations) may enable laser 680 to be operated at a more consistent temperature, such as by applying or reducing the application of heat by laser heater 690 to laser 680 in response to feedback from laser 680. Operating laser 680 at a more consistent temperature may reduce the occurrence of mode hops during operations of HAMR head 630. Reducing mode hops may reduce variations in power that laser 680 emits and may potentially improve the performance (e.g., ADC) of HAMR head 630 and its associated HDD.

Figure 7:
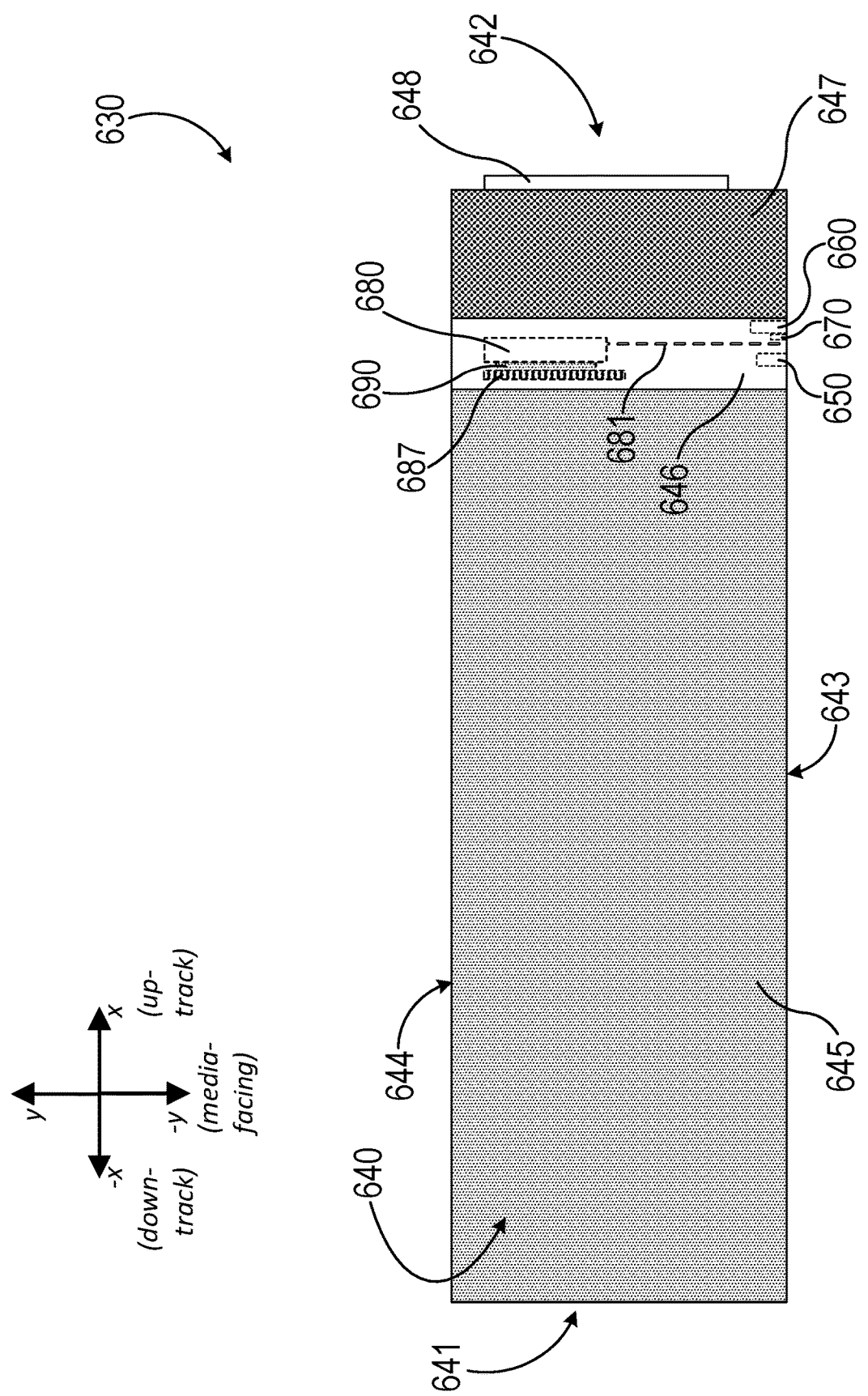
FIG. 7 is a view of an example HAMR head, in accordance with aspects of this disclosure.

FIG. 7 is a view of an example HAMR head, in accordance with aspects of this disclosure. The view of illustrated in FIG. 7 is one example of a view of HAMR head 630 of FIG. 6, with the view of HAMR head 630 illustrated in FIG. 7 indicated by line 7,8-7,8 of FIG. 6 facing in the direction of the arrows.

Slider body 640 includes a base region 645, a fabricated region 646, and an overcoat region 647. Overcoat region 647 is disposed proximal to end 642 of slider body 640. Base region 645 is disposed proximal to an end 641 of slider body 640 that is opposite end 642 of slider body 640. Fabricated region 646 is disposed between base region 645 and overcoat region 647 of slider body 640.

Base region 645 of slider body 640 may be a segment of a wafer that components of HAMR head 630 are fabricated on. In some examples, base region 645 is a segment of an aluminum titanium carbide wafer.

Laser 680 and laser heater 690 are embedded in fabricated region 646 of slider body 640. Fabricated region 646 further includes reader 650, writer 660, NFT 670, and waveguide 681. Fabricated region 646 may include these and/or other features of HAMR head 630 that are fabricated on a wafer (e.g., a wafer that base region 645 is a segment of). Reader 650, writer 660, and NFT 670 are disposed proximal to media-facing surface 643 of slider body 640. Laser 680 and laser heater 690 are disposed distal to media-facing surface 643. In the example of HAMR head 630 of FIG. 7, laser heater 690 is disposed between laser 680 and base region 645 of slider body 640. Waveguide 681 extends from laser 680 to media-facing surface 643. HAMR head 630 further includes a heat sink 687 that is embedded in fabricated region 646 proximal to laser 680 and laser heater 690. Heat sink 687 is configured to dissipate heat from laser 680. In the example of HAMR head 630 of FIG. 7, laser heater 690 is disposed between heat sink 687 and laser 680.

Overcoat region 647 is proximal to end 642 of slider body 640. Overcoat region 647 may be configured to protect and/or isolate (e.g., electrically isolate) features of HAMR head 630 (e.g., features of fabricated region 646). In some examples, one or more bondpads 648 are disposed on end 642 of slider body 640 (e.g., on overcoat region 647). Bondpads 648 may be configured to electrically couple components of HAMR head 630 (e.g., reader 650, writer 660) to circuitry of an HDD. For example, a component may be coupled to a bondpad 648, and the bondpad 648 may be soldered to a trace of an HGA (e.g., an HGA 120 of FIG. 1) that extends to a preamp or power source. In some examples, one or more bondpads 648 may be configured to electrically couple laser 680 and/or laser heater 690 to a power source (e.g., a current or voltage source). Electrically coupling laser 680 and/or laser heater 690 to a bondpad 648 may include fabricating connections (e.g., vias) during the fabrication of fabricated region 646. Other means of coupling laser 680 and laser heater 690 to a power supply are contemplated and are within the scope of this disclosure.

Figure 8:
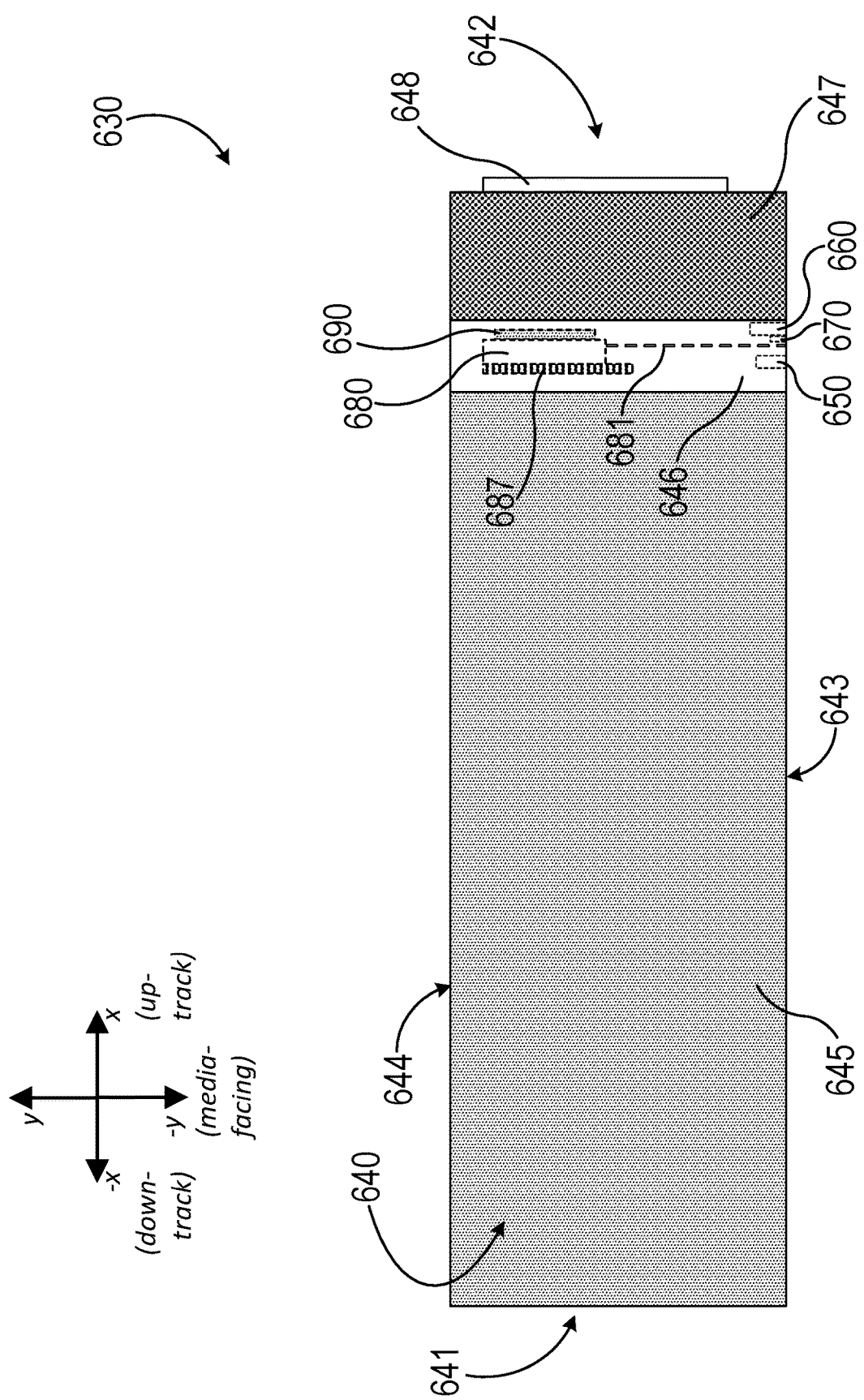
FIG. 8 is a perspective view of an example HAMR head, in accordance with aspects of this disclosure.

FIG. 8 is a perspective view of an example HAMR head, in accordance with aspects of this disclosure. The view of illustrated in FIG. 8 is one example of a view of HAMR head 630 of FIG. 6, with the view of HAMR head 630 illustrated in FIG. 8 indicated by line 7,8-7,8 of FIG. 6 facing in the direction of the arrows.

Slider body 640 includes a base region 645, a fabricated region 646, and an overcoat region 647. Overcoat region 647 is disposed proximal to end 642 of slider body 640. Base region 645 is disposed proximal to an end 641 of slider body 640 that is opposite end 642 of slider body 640. Fabricated region 646 is disposed between base region 645 and overcoat region 647 of slider body 640.

Base region 645 of slider body 640 may be a segment of a wafer that components of HAMR head 630 are fabricated on. In some examples, base region 645 is a segment of an aluminum titanium carbide wafer.

Laser 680 and laser heater 690 are embedded in fabricated region 646 of slider body 640. Fabricated region 646 further includes reader 650, writer 660, NFT 670, and waveguide 681. Fabricated region 646 may include these and/or other features of HAMR head 630 that are fabricated on a wafer (e.g., a wafer that base region 645 is a segment of). Reader 650, writer 660, and NFT 670 are disposed proximal to media-facing surface 643 of slider body 640. Laser 680 and laser heater 690 are disposed distal to media-facing surface 643. In the example of HAMR head 630 of FIG. 8, laser heater 690 is disposed between laser 680 and overcoat region 647 of slider body 640. Waveguide 681 extends from laser 680 to media-facing surface 643. HAMR head 630 further includes a heat sink 687 that is embedded in fabricated region 646 proximal to laser 680 and laser heater 690. Heat sink 687 is configured to dissipate heat from laser 680. In the example of HAMR head 630 of FIG. 8, heat sink 687 is disposed between laser 680 and base region 645.

Overcoat region 647 is proximal to end 642 of slider body 640. Overcoat region 647 may be configured to protect and/or isolate (e.g., electrically isolate) features of HAMR head 630 (e.g., features of fabricated region 646). In some examples, one or more bondpads 648 are disposed on end 642 of slider body 640 (e.g., on overcoat region 647). Bondpads 648 may be configured to electrically couple components of HAMR head 630 (e.g., reader 650, writer 660) to circuitry of an HDD. For example, a component may be coupled to a bondpad 648, and the bondpad 648 may be soldered to a trace of an HGA (e.g., an HGA 120 of FIG. 1) that extends to a preamp or power source. In some examples, one or more bondpads 648 may be configured to electrically couple laser 680 and/or laser heater 690 to a power source (e.g., a current or voltage source). Electrically coupling laser 680 and/or laser heater 690 to a bondpad 648 may include fabricating connections (e.g., vias) during the fabrication of fabricated region 646. Other means of coupling laser 680 and laser heater 690 to a power supply are contemplated and are within the scope of this disclosure.

Figure 9:
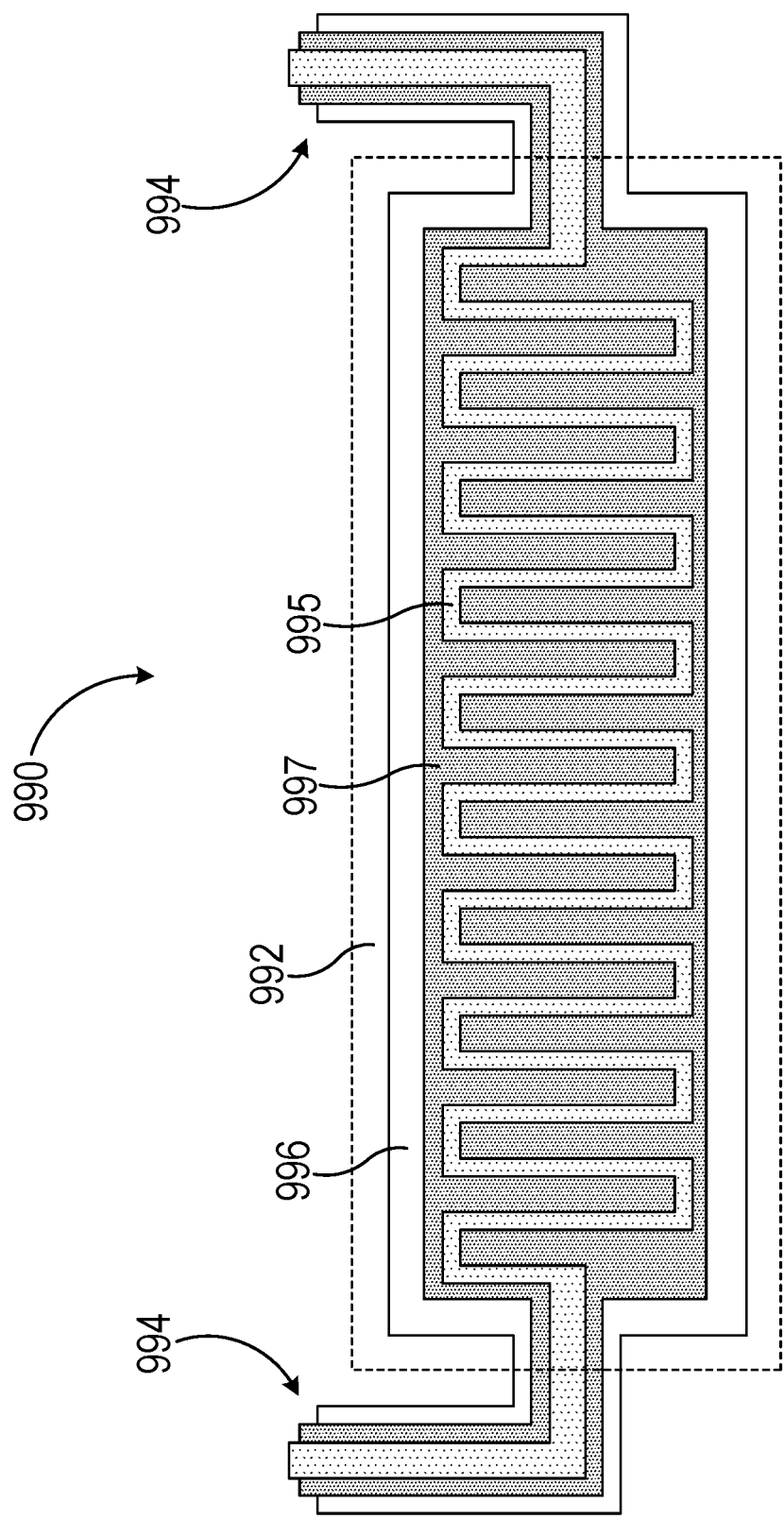
FIG. 9 is a view of a laser heater of an example HAMR head, in accordance with aspects of this disclosure.

FIG. 9 is a view of a laser heater of an example HAMR head, in accordance with aspects of this disclosure. Laser heater 990 of FIG. 9 may be an example of laser heater 290 of FIG. 2 and/or FIG. 3, laser heater 490 of FIG. 4 and/or FIG. 5, and/or laser heater 690 of FIG. 6, FIG. 7, and/or FIG. 8.

Laser heater 990 includes a heating element 992 and leads 994. Leads 994 may be electrically coupled to a power source (e.g., a power source of HDD 100 of FIG. 1). Leads 994 may be electrically coupled to a power source through an electrical contact (e.g., electrical contact 249 of FIG. 3), or through conductive channels (e.g., vias) that are fabricated during the fabrication of a HAMR head.

Heat may be generated around heating element 992 by passing current through a material of heating element 992 (e.g., through resistive heating). For example, laser heater 990 includes a conductive trace 995 that extends between leads 994 through heating element 992. Conductive trace 995 may include titanium or another conductive material. A material of conductive trace 995 may have a high melting temperature (e.g., greater than 500 degrees Celsius) to withstand the heat generated by laser heater 990 without degrading.

Conductive trace 995 is disposed in a repeated wrapped pattern through heating element 992. Such patterning and placement of conductive trace 995 may enable a higher resistance of heating element 992, potentially increasing the amount of heat generated in the vicinity of heating element 992 and decreasing the time required to heat a laser (e.g., laser 280 of FIG. 2, laser 480 of FIG. 4, laser 680 of FIG. 6).

Laser heater 990 may be disposed in a trench 996. Trench 996 may be etched in a surface that laser heater 990 is disposed on, such as segment of a wafer (e.g., base region 245 of FIG. 2, base region 445 of FIG. 5, base region 645 of FIG. 7, base region 645 of FIG. 8), or in a layer of an associated HAMR head (e.g., an insulating layer). Laser heater 990 further includes an insulating layer 997 that is configured to electrically isolate conductive trace 995. The use of insulating layer 997 is optional and its inclusion may depend on materials that surround laser heater 990. In some instances, a second insulating layer may be disposed on a side of laser heater 990 that is opposite insulating layer 997.

Various examples have been presented for the purposes of illustration and description. These and other examples are within the scope of the following claims.

What is claimed is:

1. A heat-assisted magnetic recording head comprising:
   a slider body configured to contain components of the heat-assisted magnetic recording head;
   a laser configured to emit electromagnetic radiation;
   a submount configured to couple the laser to the slider body; and
   a laser heater configured to apply heat to the laser, the laser heater embedded in the slider body,
   wherein the laser heater is embedded in a fabricated region of the slider body, the fabricated region disposed between a base region of the slider body and an overcoat region of the slider body.

2. The heat-assisted magnetic recording head of claim 1, wherein the fabricated region further comprises at least one reader, at least one writer, a near-field transducer, and a waveguide.

3. The heat-assisted magnetic recording head of claim 2, wherein the at least one reader, the at least one writer, and the near-field transducer are disposed proximal to a media-facing surface of the slider body, and
   wherein the laser heater is disposed proximal to a surface of the slider body that is opposite and substantially parallel to the media-facing surface.

4. The heat-assisted magnetic recording head of claim 1, wherein the laser heater is disposed proximal to an interface between the fabricated region and the base region of the slider body.

5. A heat-assisted magnetic recording head comprising:
   a slider body configured to contain components of the heat-assisted magnetic recording head;
   a laser configured to emit electromagnetic radiation, the laser embedded in the slider body; and
   a laser heater configured to apply heat to the laser, the laser heater embedded in the slider body and disposed proximal to the laser,
   wherein the laser and the laser heater are embedded in a fabricated region of the slider body, the fabricated region disposed between a base region of the slider body and an overcoat region of the slider body.

6. The heat-assisted magnetic recording head of claim 5, wherein the fabricated region further comprises at least one reader, at least one writer, a near-field transducer, and a waveguide.

7. The heat-assisted magnetic recording head of claim 6, wherein the at least one reader, the at least one writer, and the near-field transducer are disposed proximal to a media-facing surface of the slider body, and
   wherein the laser and the laser heater are disposed distal to the media-facing surface.

8. The heat-assisted magnetic recording head of claim 5, wherein the laser heater is disposed between the laser and the base region of the slider body.

9. The heat-assisted magnetic recording head of claim 8, further comprising a heat sink, wherein the laser heater is disposed between the heat sink and the laser.

10. The heat-assisted magnetic recording head of claim 5, wherein the laser heater is disposed between the laser and the overcoat region of the slider body.

11. The heat-assisted magnetic recording head of claim 10, further comprising a heat sink disposed between the laser and the base region.

* * * * *